United States Patent
Stewart

[15] 3,692,399
[45] Sept. 19, 1972

[54] MICROFILM VIEWER

[72] Inventor: Marshall E. Stewart, Redondo Beach, Calif.

[73] Assignee: Stewart Filmscreen Corp., Torrance, Calif.

[22] Filed: June 23, 1970

[21] Appl. No.: 49,028

[52] U.S. Cl. .................353/27, 353/99, 353/78
[51] Int. Cl. ....................G03b 23/08, G03b 21/28
[58] Field of Search..........353/25, 26, 27, 73, 74, 75, 353/76, 77, 78, 122, 98, 99

[56] References Cited

UNITED STATES PATENTS

| | | | |
|---|---|---|---|
| 2,727,427 | 12/1955 | Jenkins | 353/28 |
| 3,413,061 | 11/1968 | Simpson | 353/27 |
| 3,424,524 | 1/1969 | Akiyama | 353/78 |
| 3,319,517 | 5/1967 | Rindas | 353/78 |
| 3,316,806 | 5/1967 | Coulman | 353/85 |

Primary Examiner—Leonard Forman
Assistant Examiner—A. J. Mirabito
Attorney—Shoemaker & Mattare

[57] ABSTRACT

A microfilm viewer for viewing of microfilm frames by an individual and comprising a light source positioned to project a beam of light through a microfilm frame and a lens system onto a beam splitter which reflects the projected image of the microfilm frame onto a reflex reflector screen arranged to reflect the projected image back to and through the beam splitter to be viewed by the individual. Means are provided for varying the intensity of the light source to reduce the brilliance of the projected magnified and reflected image to an eye tolerable level. The magnified and reflected image has excellent definition and brilliance and may be viewed irrespective of ambient light conditions.

12 Claims, 4 Drawing Figures

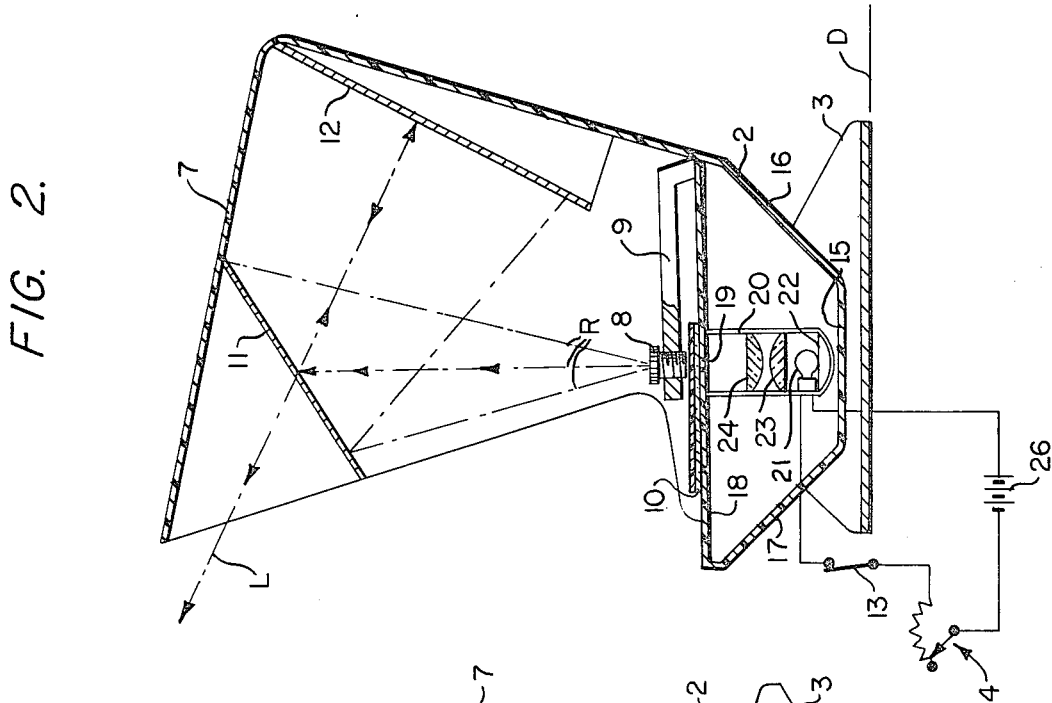
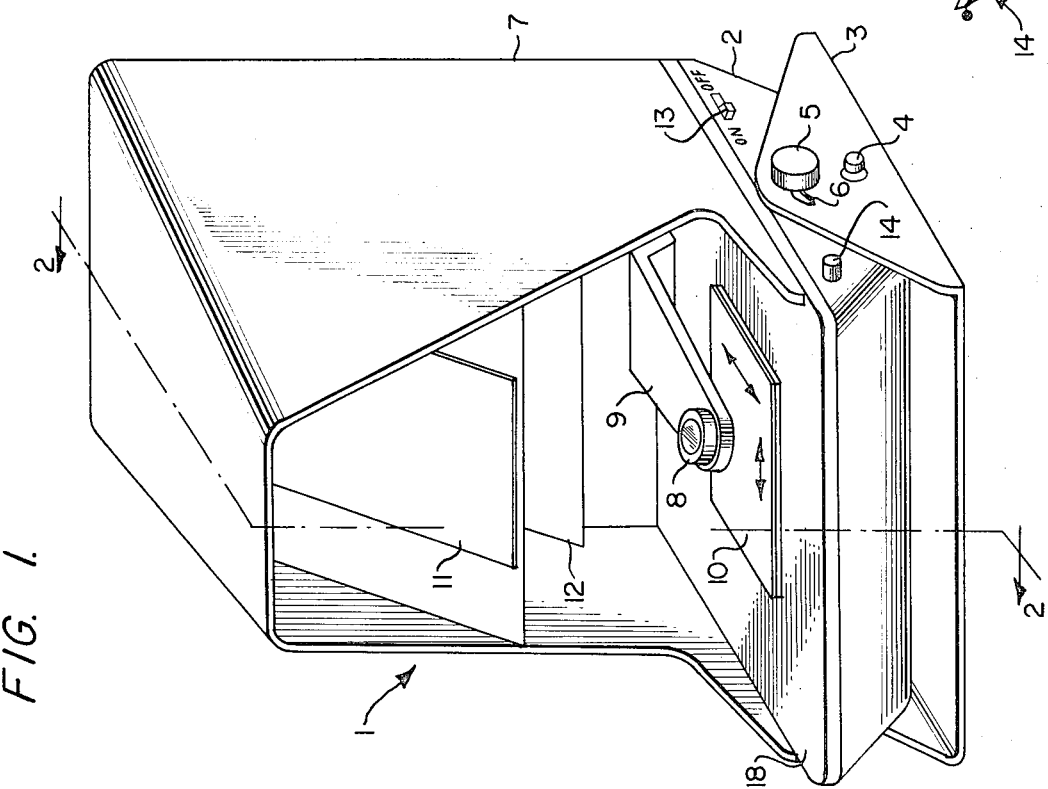

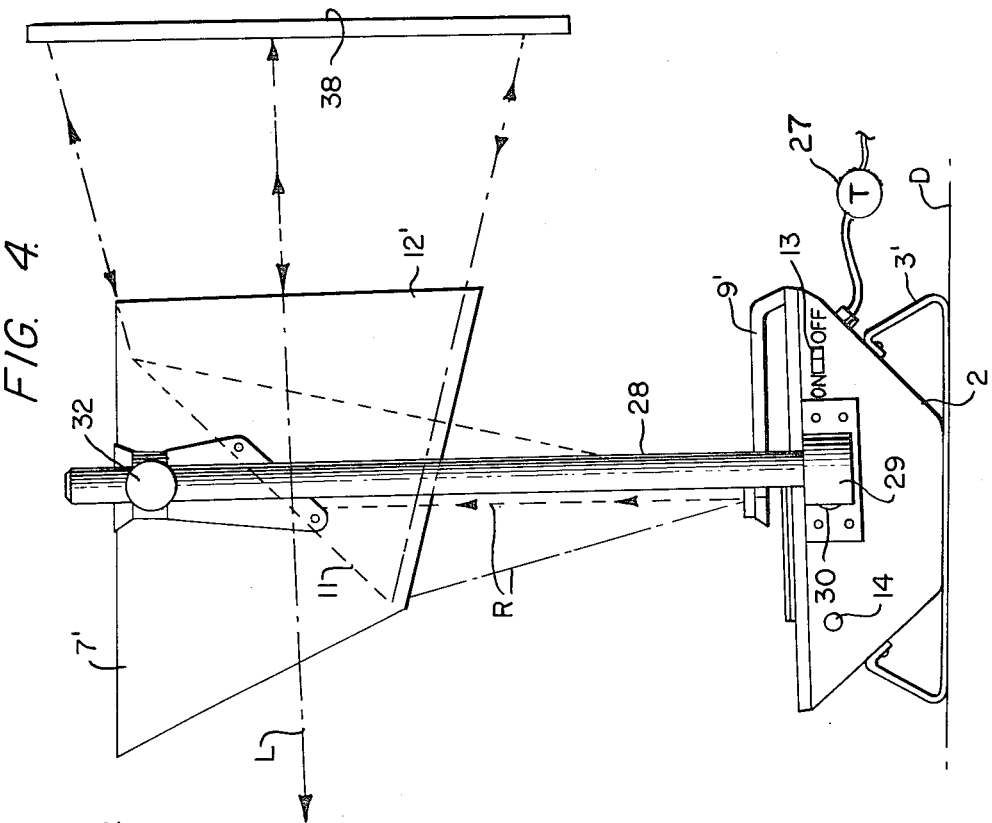
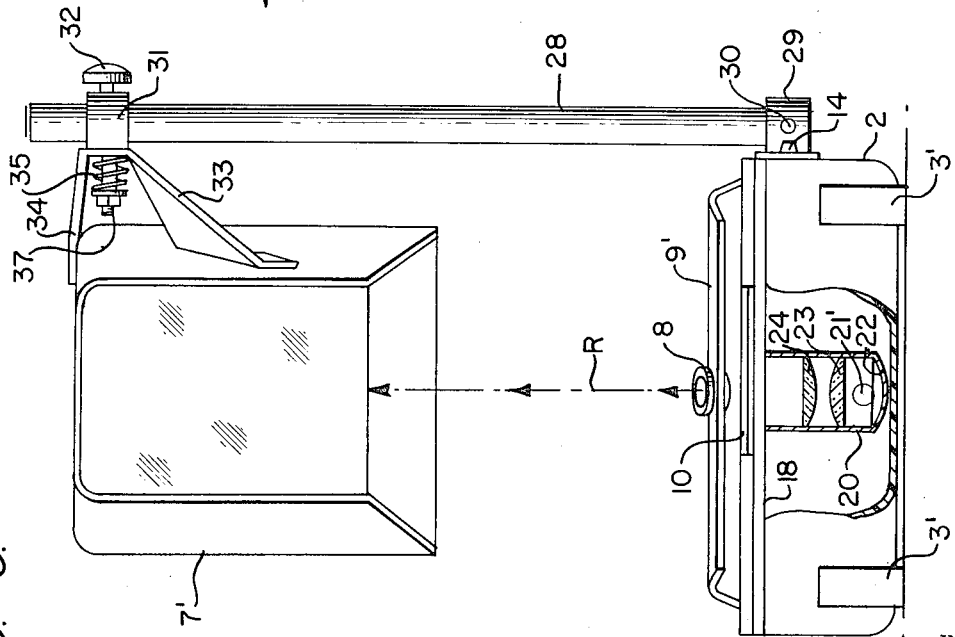

MICROFILM VIEWER

BACKGROUND OF THE INVENTION

This invention relates to the art of film viewing and more particularly, to the art of microfilm viewing. Prior art film viewing devices have means for projecting an image onto a screen for viewing by an observer. Many of these prior art film viewing devices are quite large and are intended to be permanently positioned at a location having ambient light conditions of a suitable low intensity so that the projected image of the film may be viewed with clarity. Generally, such devices do not have means for varying the light intensity of the viewing apparatus in order to project an image which will have sufficient brilliancy to be observed clearly without regard to ambient light conditions. Further, the arrangement of projection screens, magnifying lenses and the like, in such devices is generally not such as to render a clear, sharp and brilliant image.

The present invention provides a film viewing device wherein a light source having a variable intensity is provided for projecting a magnified image having a desired brilliancy so that the projected image may be viewed clearly and sharply without regard to ambient light conditions.

Further, the various reflecting screens of the present invention are arranged such as to afford an exceptionally sharp and highly resolved image of the film being viewed. The film viewing device, according to the present invention, is portable and may be easily carried from place to place and positioned upon the top of a desk or table or the like for viewing of microfilm frames by an individual in locations where the ambient light conditions are not suitable for film viewing by prior art film viewing devices.

In one form of the invention, the complete film viewing device is entirely self-contained in a unitary portable housing, and a source of electrical energy is confined within that housing for providing the energy necessary to illuminate the film frame. Further, the reflecting screen means for reflecting the projected image are confined within a hood means for shielding the screen means from ambient light and the hood means and reflector screen means is adjustable so as to render the device readily usable by persons of different height.

In a second form of the invention, the reflecting screen means are confined within a hood means which is vertically and pivotally adjustably mounted on an upright shaft so that the screen means and hood means may be adjusted relative to the film frame and associated light source and lens means. Means is provided whereby the reflex reflector screen, normally confined within the hood means, may be removed and the projected image reflected onto a remote reflex reflector screen so that images which are magnified to a degree too large for the reflex reflector screen confined within the hood, may be reflected to the remote reflex reflector screen which is sufficiently large to handle the magnified projected images. Means is also provided in the second form of the invention for varying the intensity of the light source which, in a preferred form, is energized from a remote electrical source.

OBJECTS OF THE INVENTION

It is an object of this invention to provide a film viewing device which provides a clear and sharp projected magnified image of a film frame.

It is another object of this invention to provide a film viewing device which is entirely self-contained and is easily portable so that a person using the device may view film frames at a location which would not be possible or practical with prior art film viewing devices.

Still another object of the invention is to provide a portable and self-contained microfilm viewing device which enables a person to privately view a projected magnified image of a microfilm frame.

A still further object of the invention is to provide a film viewing device which is completely self-contained and which may be used at places wherein the ambient conditions would render the use of conventional film viewing devices undesirable or impossible.

An even further object of the invention is to provide a film viewing device wherein a projected magnified image of the film frame is projected onto a remotely located screen.

Another object of the invention is to provide a film viewing device wherein the light source for illuminating the film frame has a variable intensity so that a desired brilliance of the projected image may be obtained for viewing by a person using the device without regard to ambient light conditions and whereby the brilliance of the projected image may be adjusted to a level tolerable to the eye of the observer.

BRIEF DESCRIPTION OF THE DRAWINGS

FIG. 1 is a top perspective view of one form of the film viewing device according to the present invention.

FIG. 2 is a side view in section of the film viewing device of FIG. 1 and is taken along the line 2—2.

FIG. 3 is a front view in elevation, partly in section, of a second form of the film viewing device according to the present invention.

FIG. 4 is a side view in elevation of the film viewing device shown in FIG. 3 and illustrating the manner in which a remote reflex reflector screen is used for viewing images which are magnified to an extent too great for the reflex reflector screen confined within the hood means of the device.

DETAILED DESCRIPTION OF THE INVENTION

Referring now to the drawings wherein like reference numerals refer to like parts throughout the several views, a first form of the invention is indicated generally at 1 in FIG. 1. Basically, the film viewer 1 comprises a hollow base portion 2 mounted for pivotal movement on a housing means including a base or stand 3 about the pivot pins 4 provided at each side of the stand. Clamping screw means 5 are provided on the base portion extended through a slot 6 in the stand 3 for adjusting the base 2 to different angular positions of adjustment. The housing means also includes a hood 7 fixed on the base 2 and an objective lens means 8 is supported on a support arm 9 within the hood 7 in a position immediately above the base 2 for viewing a film frame 10 placed on top of the base 2. A beam splitter 11 is mounted in a top portion of the hood for reflecting an image projected through the objective lens means 8 onto a reflex reflector screen 12 mounted in the upper rear portion of the hood.

An "on and off" switch 13 is provided in the base 2 for energizing the light source for illuminating the film frame and a potentiometer or rheostat 14 is provided in the base for varying the intensity of illumination of the light source.

Referring now to FIG. 2, wherein details of construction of the microfilm viewer can be seen, the base 2 comprises a bottom wall 15, side walls 16 and 17, and a top wall 18. An orifice 19 is formed generally centrally in the top wall 18. Confined within the base 2 and fitted to the bottom surface of the top wall 18 in substantially co-axial relationship with orifice 19, is a tubular housing 20 in which is confined the light source or lamp 21. Also, disposed within the tubular member 20 and located below the lamp 21, is a reflecting means 22 closing the end of the tubular member. A pair of lens means 23 and 24 comprising a collecting lens system is disposed within the tubular member above the lamp 21 and intermediate the lamp and the orifice 19. The circuitry for energizing the lamp 21 is schematically shown in this figure as disposed externally of the base 2, but it is to be understood that the energy source for the lamp 21 is confined wholly within the base. The circuitry comprises a six volt battery 26 of either the wet cell or dry cell type, the potentiometer or rheostat 14 and the "on and off" switch 13. The film plate 10 is movably supported on top of wall 18 in operative position over the orifice 19 such that light from the lamp 21 passes upwardly through orifice 19 and illuminates the frame of microfilm or the like for magnification and focusing by the objective lens 8 which is adjustably supported in support arm 9 immediately above the microfilm frame 10. The objective lens 8 projects a focused image of the microfilm frame onto the beam splitter 11, which is supported in the hood at an angle to the horizontal.

The construction of the beam splitter is well known in the art and consists essentially of a plate of light transparent material, such as glass, having one face thereof coated with a relatively thin semi-transparent metallic film which forms a partial mirror surface such that the extent of reflection of an image projected thereon is within the range of 25 to 75 percent but preferably about 40 percent.

The positioning of the beam splitter 11 is such that the rays R passing upwardly from the objective lens 8 strike the beam splitter at an acute angle and are reflected to the reflex reflector screen 12 located at the back of the hood 7 in such a manner as to permit the axis ray to strike the reflex reflector screen substantially at a right angle thereto. These reflected rays are then reflected by the reflex reflector screen back along the axis of reflection to and through the beam splitter 11 along the line of sight L for observation from the non-reflecting side of the beam splitter 11 by the person using the film viewing device.

The reflex reflector screen is of well-known construction and consists essentially of a plane-surfaced light translucent body having a reflector coating containing glass or resinous beads measuring from 3 to 10 mils. in diameter. Such a surface coating is known in the art as a reflex reflector or catadioptric system and will reflect both paraxial and normal rays back to their source. In general, reflex reflector screens described in Palmquist U.S. Pat. Nos. 2,294,903 and 2,379,741, are suitable for use as the reflex reflector screen of the present invention.

Because the film viewer illustrated in FIGS. 1 and 2 is completely self-contained and relies upon a 6 volt battery for energizing the light for illuminating the microfilm frame, the viewer may be used in remote areas where a normal 110 volt power source is unavailable and even though it is necessary to reduce the intensity of the light to an eye tolerable level. Furthermore, the battery operated viewer described with relation to FIGS. 1 and 2 can be used under conditions wherein there is a danger of fire or explosion or where the ambient atmosphere has a high moisture content. In such case, the lamp, wiring, switch and battery would be suitably vapor proofed.

The second form of the invention is shown in FIGS. 3 and 4 and reference will now be made to those figures wherein elements corresponding to the same elements in FIGS. 1 and 2 will be indicated by the same reference numerals primed, while the identical elements to those illustrated in FIGS. 1 and 2 will be indicated by the same reference numerals.

As seen in these figures, the base 2 is of identical construction to the base 2 of the first embodiment and the light source and lens system is also identical to that described in relation to FIGS. 1 and 2 except that the light is a 12 volt lamp 21'. The base 2 is supported on a modified support comprising a pair of legs 3' disposed adjacent opposite sides, respectively, of the base 2 for supporting the viewer on the top of a desk or table or the like D. The objective lens system 8 is adjustably supported in a support arm 9' which is secured to the top wall 18 of the base and is dimensioned such as to position the objective lens 8 immediately above a film frame 10 adjustably disposed over the orifice 19 through the top wall 18 of the base.

In this form of the invention, the source of energy for illuminating the lamp 21' is taken from an external power source by means of the cord or cable 27 and is stepped down by transformer T to approximately 12 volts for illuminating the 12 volt lamp 21'. An "on and off" switch 13 and a potentiometer or rheostat 14 is provided for regulating the intensity of illumination in this form of the invention just as in the form first described.

The hood means 7' is adjustably mounted on an upright or standard 28 which is suitably secured to the base portion by means of bracket 29 and set screw 30. The hood means 7' is vertically adjustably supported adjacent the upper end of the standard 28 by a collar 31 fitted around the standard 28 and adapted to be secured in selected vertical positions by set screw 32. The hood is carried on the collar 31 by a pair of arms or brackets 33 and 34 which are urged into frictional engagement with the collar 31 by means of a spring 35 extended between the arms and a nut 36 threaded on a bolt 37. The spring 35 is sufficiently strong to maintain enough frictional engagement between the arms 33 and 34 and the collar 31 to normally securely hold the hood means 7' in adjusted tilted position, but the hood means 7' may be pivotally adjusted about the axis of bolt 37 to desired pivoted adjusted positions. rays The hood means 7' comprises a generally U-shaped member having an open front, an open bottom and an open back closed by reflex reflector screen 12'. In normal use for normal magnification of microfilm frames, the reflex reflector screen 12' is left in position; and the film viewer is used in the same manner as the viewer described in relation to FIGS. 1 and 2; that is, the rays R from the illuminated microfilm frame are projected upwardly onto the beam splitter which reflects the ray to the reflex reflector screen 12' which then reflects the rays back to and through the beam splitter to be viewed by an observer. However, i in the case where the magnification of the film frame is too large for proper focusing on and reflection by the reflex reflector screen 12', the screen 12' is removed and a remote reflex reflector screen 38 is utilized.

The size of the microfilm frames and the required degree of magnification to enlarge the image to a size easily readable or having sufficient definition and clarity to be easily examined when projected on a screen may vary widely in both of the film viewing devices aforedescribed. Accordingly, the objective lens system 8 is preferably an interchangeable means and the provision of a plurality of objective lenses, each having different degrees of magnification covering the entire range of magnification necessary for all types and sizes of microfilm is contemplated and is to be considered within the scope of the present invention. Generally, in the art of microfilm production, reduction of the information contained on the film to 35mm and to even smaller sizes called variously microfiche, ultrafiche and microdot, is practiced and the device of the present invention is adapted to be used with all such microfilm sizes. Further, a means may be provided to vary the size of the aperture 19 so that the device can readily be adapted for use with continuous film or aperture cards or film plates of various film sizes and by the use of conforming proper lens magnification in the objective lens means 8, all forms of information reduction and magnification embraced in the art of microfilm production are compatible with and utilizable in this invention.

In both forms of the invention, the microfilm frame is mounted in movable relationship over the orifice 19 and the means for moving the frame may vary widely without departing from the invention. For example, it is common practice in the art at present to mount a plurality of microfilm frames in closely spaced relationship upon a light transparent plate and to provide a means (not shown) to movably sustain the plate so that each microfilm frame can be selectively moved into a position over the orifice for the projection of the beam of light through the frame to illuminate the frame. This means is preferably manually operative and may be widely varied in type and kind without departure from the invention.

To illustrate the efficiency of the aforedescribed microfilm projection system, the small 12 volt lamp 21' in a normal optical system including the reflector 22, collecting lens system 23 and 24, aperture 19, microfilm 10 and objective lens means 8, provides enough illumination for clear viewing of an image projected along the aperture axis to the partial mirror beam splitter 11 and reflected thereby to a reflex reflector screen 12, located at the required throw distance in front of the viewer, as large as 6 feet wide and 8 feet high. Excellent definition and brilliance of the reflected image on the screen 12 are available to the viewer at a light level tolerable to the eye of the viewer under high level ambient light conditions which would ordinarily render a normal projection system useless.

While the present invention has been described and illustrated as applied to the viewing of transparencies, it is also adapted, with a slight modification, to the projection of images formed on opaque materials such as a page of a book, opaque microfilm, or microscopic displays by providing proper surface illumination of the subject material in place of and in substitution of the beam of light projected through a transparent film. The reflected light could then be collected and passed through an objective lens to the beam splitter 11 and redirected to the reflex reflector screen 12 as above described. The resultant image brilliance would be much greater than with existing viewing systems with the same low voltage projection lamp size as herein described. Such a modification or adaptation of the present invention is contemplated and is to be considered within the scope of the appended claims.

It is further contemplated as within the scope of the present invention to use an additional beam splitter located between the viewer and the beam splitter 11, which would redirect the reflected image at another angle so that an additional person could also view the reflected magnified image if and when desired.

The major difference between the two devices is that in place of the battery energized 6 volt lamp 21 in the modification of FIGS. 1 and 2, the modification illustrated in FIGS. 3 and 4 is provided with a 12 volt lamp 21' energized from an external circuit 27 containing a stepdown transformer T. Further, the viewer illustrated in FIGS. 3 and 4 is adapted to project the magnified image of an illuminated microfilm frame onto a remote enlarged reflex reflector screen.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, and therefore intended to be embraced by those claims.

I claim:

1. A microfilm viewing device for use under relatively bright ambient light conditions comprising: a housing means having a base and a hood, said hood having a top wall, opposite side walls, and an open front, projection means in the base for projecting an image of a microfilm frame upwardly into said hood; a reflecting beam splitter secured in inclined position in a front portion of the hood in the path of the projected image in a position to intercept the projected image and to angularly reflect a reflected image thereof rearwardly in the hood, and a reflex reflector screen secured in the hood in rearwardly spaced relationship to the beam splitter in the path of the reflected image in a position to intercept the reflected image and to reflect the same back toward the open front along the axis of image reflection and to and through the beam splitter and the open front to be viewed by an observer.

2. A microfilm viewing device as in claim 1, wherein the reflex reflector screen is removably secured in the hood so that it can be removed from the hood to provide an opening in the hood through which the reflected image is reflected onto a reflex reflector screen remote from the hood.

3. The film viewing device as defined in claim 1, wherein said beam splitter is disposed in a plane at an angle to the horizontal in determined spaced relation to the film frame to reflect a reflected image of said film frame at an acute angle to the axis of image projection; and wherein said reflex reflector screen is disposed in desired spaced relation to said beam splitter in a plane perpendicular to the axis of reflection.

4. The film viewing device as defined in claim 1, wherein said means for projecting an illuminated image of a film frame includes means for varying the intensity of the light radiation.

5. The film viewing device as defined in claim 1, wherein means are provided for magnifying the projected image of said film frame.

6. The film viewing device as defined in claim 1, wherein means is provided for varying the intensity of the light radiation in the projected image, said means including a low voltage lamp and means for regulating the amperage of the electric current energizing said lamp.

7. The film viewing device as defined in claim 6, wherein said low voltage lamp is a 6 volt lamp.

8. The film viewing device as defined in claim 6, wherein said low voltage lamp is a 12 volt lamp.

9. The film viewing device as defined in claim 1, wherein said film viewing device is completely self-contained and enclosed within a portable unitary housing.

10. A film viewing device comprising: a housing having a base portion, a hood portion fixed to said base portion, said base portion including side walls, a bottom wall and a top wall, an orifice opening generally centrally through said top wall, a tubular housing means confined within said base portion and fitted to said top wall about said orifice, a lamp in said tubular housing adjacent the lower end thereof, a reflecting means disposed within and closing the lower end of said tubular housing, a collecting lens system disposed in said housing intermediate said lamp and said orifice, battery means confined within said base and connected to said lamp for illuminating said lamp, rheostat means for varying the current supplied to said lamp by said battery means to vary the intensity of illumination, switch means for controlling the supply of current to said lamp, said base portion being adjustably pivotally mounted to a stand adapted to be placed upon the surface of a desk or table or the like so that said film viewing device may be adjustably tilted to different positions, a firm frame selectively adjustably disposed on said top wall of said base portion over said orifice, an objective lens means adjustably supported by a support arm over said orifice and above said film frame for projecting an illuminated and magnified image of said film frame upwardly, a beam splitter secured in an upper portion of said hood means at an angle to the horizontal and above said objective lens means such that the projected illuminated magnified image strikes the beam splitter at an acute angle and is reflected thereby in a generally horizontal direction, a reflex reflector screen in the upper back portion of said hood means in a plane perpendicular to the axis of reflection of the projected image reflected from said beam splitter so that said projected image is reflected back to and through said beam splitter for viewing by the eyes of an observer.

11. A film viewing device comprising a base portion having side walls, a bottom wall and a top wall, an orifice through said top wall, a tubular housing confined within said base portion and fitted to said top wall about said orifice, a lamp means disposed within said tubular housing, a reflector means disposed within said tubular housing below said lamp means, a collecting lens means disposed in said tubular housing above said lamp means and intermediate said lamp means and said orifice, an objective lens means adjustably carried above said orifice by a support arm mounted to said base, an upright standard carried by said base portion and extending vertically upwardly above said base, a hood means vertically and pivotally adjustably carried by said standard in predetermined spaced relationship from said base, a beam splitter secured within said hood for receiving a projected illuminated magnified image of the film frame and for reflecting said projected image to a reflex reflector screen secured within said hood means and comprising a back wall of said hood means, said reflex reflector screen disposed in a plane perpendicular to the axis of reflection of said projected image so as to reflect said projected image back to and through said beam splitter for viewing by the eyes of an observer, said reflex reflector screen being removable from said hood means to provide an opening in the back wall thereof through which the reflected projected image may be reflected to a remotely located reflex reflector screen.

12. A microfilm viewing device as in claim 11, wherein said reflex reflector screen is disposed in vertical position and normal to the axis of image reflection.

* * * * *